(12) United States Patent
Kikuchi (10) Patent No.: US 9,288,544 B2
(45) Date of Patent: Mar. 15, 2016

(54) PROGRAM-SCHEDULE-GENERATING DEVICE, PROGRAM-DATA-SHARING SYSTEM, METHOD OF GENERATING PROGRAM SCHEDULE, AND COMPUTER PROGRAM

(75) Inventor: Daisuke Kikuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/948,484

(22) PCT Filed: Sep. 7, 2012

(86) PCT No.: PCT/JP2012/072871
§ 371 (c)(1),
(2), (4) Date: Jul. 23, 2013

(87) PCT Pub. No.: WO2013/035835
PCT Pub. Date: Mar. 14, 2013

(65) Prior Publication Data
US 2014/0173658 A1 Jun. 19, 2014

(30) Foreign Application Priority Data

Sep. 9, 2011 (JP) .................................. 2011-197344

(51) Int. Cl.
*H04N 21/4788* (2011.01)
*H04N 21/482* (2011.01)
(Continued)

(52) U.S. Cl.
CPC ........... *H04N 21/478* (2013.01); *H04N 21/254* (2013.01); *H04N 21/25883* (2013.01);
(Continued)

(58) Field of Classification Search
CPC .................. H04N 21/26283; H04N 21/26291; H04N 21/4314; H04N 21/4316; H04N 21/4622; H04N 21/482
USPC .......................................... 725/40, 48, 51, 56
See application file for complete search history.

(56) References Cited

U.S. PATENT DOCUMENTS 8,739,213 B2 * 5/2014 Angiolillo et al. ............... 725/40
2009/0133071 A1 5/2009 Sakai et al.
(Continued)

FOREIGN PATENT DOCUMENTS

EP 1841220 A2 3/2007
JP 2004-173252 A 6/2004
(Continued)

OTHER PUBLICATIONS

International Search Report issued in PCT Application No. PCT/JP2012/072871 mailed on Nov. 20, 2012.
(Continued)

*Primary Examiner* — Benjamin R Bruckart
*Assistant Examiner* — Tien M Nguyen
(74) *Attorney, Agent, or Firm* — MKG, LLC (57) ABSTRACT

To share program data between a plurality of information providers, between which providers there exists a predetermined association, whereby a program schedule for each of the information providers can be acquired.
The program-schedule-generating device stores program data provided by a plurality of information providers. The program-schedule-generating device specifies a subject user, who is an information provider to which program schedule data is to be transmitted, and specifies another information provider having a predetermined association with the user. The predetermined association referred to here is, for example, a condition in which users are members of an identical service (such as an SNS). The program-schedule-generating device extracts the program data provided by the information providers, generates program schedule data based on the program data, and transmits the program schedule data.

9 Claims, 7 Drawing Sheets

(51) Int. Cl.
*H04N 21/262* (2011.01)
*H04N 21/478* (2011.01)
*H04N 21/2665* (2011.01)
*H04N 21/2668* (2011.01)
*H04N 21/458* (2011.01)
*H04N 21/462* (2011.01)
*H04N 21/254* (2011.01)
*H04N 21/258* (2011.01)

(52) U.S. Cl.
CPC ....... *H04N21/25891* (2013.01); *H04N 21/262* (2013.01); *H04N 21/2665* (2013.01); *H04N 21/2668* (2013.01); *H04N 21/26283* (2013.01); *H04N 21/458* (2013.01); *H04N 21/4622* (2013.01); *H04N 21/4788* (2013.01); *H04N 21/4821* (2013.01)

(56) References Cited

U.S. PATENT DOCUMENTS

| | | | | |
|---|---|---|---|---|
| 2009/0178000 | A1* | 7/2009 | Kwon et al. | 715/810 |
| 2010/0293575 | A1* | 11/2010 | Biniak | 725/40 |
| 2011/0185385 | A1 | 7/2011 | Park et al. | |
| 2012/0110621 | A1* | 5/2012 | Gossweiler, III | 725/46 |

FOREIGN PATENT DOCUMENTS

| | | |
|---|---|---|
| JP | 2005-167628 | 6/2005 |
| JP | 2007-274604 | 10/2007 |
| JP | 2008-199103 | 8/2008 |
| JP | 2009-055095 | 3/2009 |
| JP | 2009-141952 | 6/2009 |
| JP | 2009-152745 | 7/2009 |
| WO | 2007-086381 A1 | 8/2007 |

OTHER PUBLICATIONS

Notification of Reasons for Rejection issued in Japanese Application No. 2013-532666, mailing date Jul. 8, 2014.
Final Office Action issued in corresponding Japanese Patent Application No. 2013-532666, mailed Oct. 7, 2014, pp. 3.
Extended European Search Report for EP Application No. 12830789.9-1908/2755386, dated Jan. 7, 2015.
First Office Action for Chinese Patent Application No. 201280004534.0 dated Sep. 2, 2015, with English translation.

* cited by examiner

| SEPTEMBER 1 | CHANNEL 1 | CHANNEL 2 | CHANNEL 3 |
|---|---|---|---|
| 20 | | ☺ B<br>•CAN'T MISS IT! | |
| 21 | I11<br>😐 A<br>•GO HOME EARLY | ☹ C<br>•INTERESTING...<br>I12 | I13 |
| 22 | | | E APPEARING!<br>DON'T MISS IT! |

FIG. 8A

| SEPTEMBER 1 | I21 CHANNEL 1 | I12 CHANNEL 2 | CHANNEL 3 | |
|---|---|---|---|---|
| 20 | VVV PART O<br>...............!<br>...............。 | ☺ B<br>•CAN'T MISS IT! | TODAY'S YY | I24 |
| 21 | 😐 A<br>•GO HOME EARLY<br>I11 | ☹ C<br>•INTERESTING...<br>SOCCER RELAY BROADCASTING<br>A-B<br>X STADIUM | SPORT NEWS FLASH<br>ZZZ | I25 |
| 22 | I22<br>NEWS 22<br>COMMENTATOR:<br>WWW | | E APPEARING!<br>DON'T MISS IT! | I13 |

FIG. 8B  I23

| SEPTEMBER 1 | CHANNEL 1 | CHANNEL 2 | CHANNEL 3 |
|---|---|---|---|
| 20 | | ☺ B<br>·I MISSED IT... | |
| 21 | I11<br>☹ A<br>·CAN'T SLEEP THINKING OF NEXT EPISODE | ☹ C<br>·TOO BAD!<br>I12 | I13 |
| 22 | | | ☹ C<br>·E FANTASTIC! |

PROGRAM-SCHEDULE-GENERATING DEVICE, PROGRAM-DATA-SHARING SYSTEM, METHOD OF GENERATING PROGRAM SCHEDULE, AND COMPUTER PROGRAM

TECHNICAL FIELD

The present invention relates to a technique for sharing between a plurality of users program data useful for viewing a program.

BACKGROUND ART

There are known in the art services for providing information on a program that is broadcast for viewing on a television. As such a service, in addition to a service for providing information by a printed publication, there is known a service for distributing information via the Internet, and a service for displaying program information on a main unit of a television receiver (hereinafter, simply referred to as a "television") by use of an Electronic Program Guide (EPG). Additionally, JP2009-55095A describes a technique for providing a suggested viewing schedule of video content to a user based on a viewing history of the user.

Many program schedules provided in the art have uniform content. Such a program schedule may be inconvenient for a user in that it does not allow the user to view information about a program to be broadcast in the future, or to view information on a program that has already been broadcast. This restriction exists because such a program schedule allows viewing of information about a program only within a period during which such information is made available to a user by a provider.

On the other hand, while use of a technique as described in JP2009-55095A enables a user to acquire a viewing schedule based on an action of the user, the technique does not enable an action of a person other than the user to be reflected in the viewing schedule.

SUMMARY

An object of the present invention is to share program data between a plurality of information providers, between which providers there exists a predetermined association, whereby a program schedule for each of the information providers can be acquired.

A program-schedule-generating device according to an embodiment of the present invention includes: a first acquiring unit that acquires a plurality of first program data items provided by a plurality of information providers, the plurality of first program data items describing information on a program already broadcast by a broadcasting station on a particular date and time or scheduled to be broadcast by a broadcasting station on a particular date and time, the plurality of first program data items including at least information used for identifying the program; an extracting unit that extracts from the plurality of first program data items acquired by the first acquired unit, a first program data item provided by a subject information provider of the plurality of information providers, and a first program data item provided by another information provider associated with the subject information provider; and a generating unit that generates program schedule data based on the first program data items extracted by the extracting unit, the program schedule data forming a program schedule for the subject information provider.

In a preferred embodiment, the plurality of the information providers include at least a viewer of the program; and the program-schedule-generating device further comprises a second acquiring unit that acquires a second program data item provided by an information provider, the information provider providing the viewer with the second program data item on a commercial basis, and wherein the generating unit generates the program schedule data using the first program data items extracted by the extracting unit and the second program data item acquired by the second acquiring unit.

In another preferred embodiment, the generating unit includes a supplementing unit that supplements information on a program to be displayed in the program schedule with the second program data item when the second acquiring unit acquires the second program data item describing information on the same program as that included in the first program data items extracted by the extracted unit.

Further, in another preferred embodiment, the generating unit includes a selecting unit that selects whether to permit display of information on a program, the information being included in a plurality of information items on a program displayed in the program schedule and also being displayed irrespective of the first program data items; and the generating unit generates the program schedule data based on a result of selection by the selecting unit.

Further, in another preferred embodiment, when the extracting unit extracts a plurality of first program data items describing information on a single program, the generating unit generates the program schedule data such that information on the program is displayed in the program schedule in a color that varies according to a number of the extracted first program data items.

Further, in another preferred embodiment, the program-schedule-generating device further includes a third acquiring unit that acquires area information representing an area corresponding to the information providers, and wherein the extracting unit uses the area information acquired by the third acquiring unit for determining an association between the subject information provider and the other information provider.

A program-data-sharing system according to another embodiment of the present invention includes: the program-schedule-generating device; and a plurality of display devices used by the plurality of the information providers for displaying the program schedule data.

A method of generating a program schedule according to another embodiment of the present invention includes: a first step of acquiring a plurality of first program data items provided by a plurality of information providers, the plurality of first program data items describing information on a program already broadcast by a broadcasting station on a particular date and time or scheduled to be broadcast by a broadcasting station on a particular date and time, the plurality of first program data items including at least information used for identifying the program; a second step of extracting from the plurality of first program data items acquired in the first step, a first program data item provided by a subject information provider of the plurality of information providers, and a first program data item provided by another information provider associated with the subject information provider; and a third step of generating program schedule data based on the first program data items extracted in the second step, the program schedule data forming a program schedule for the subject information provider.

A program according to another embodiment of the present invention for causing a computer to execute: a first step of acquiring a plurality of first program data items provided by a plurality of information providers, the plurality of first program data items describing information on a program already broadcast by a broadcasting station on a particular date and time or scheduled to be broadcast by a broadcasting station on a particular date and time, the plurality of first program data items including at least information used for identifying the program; a second step of extracting from the plurality of first program data items acquired in the first step, a first program data item provided by a subject information provider of the plurality of information providers, and a first program data item provided by another information provider associated with the subject information provider; and a third step of generating program schedule data based on the first program data items extracted in the second step, the program schedule data forming a program schedule for the subject information provider.

According to the present invention, it is possible to share program data between a plurality of information providers, between which providers there exists a predetermined association, whereby a program schedule for each of the information providers can be acquired.

DETAILED DESCRIPTION

First Embodiment

Figure 1:
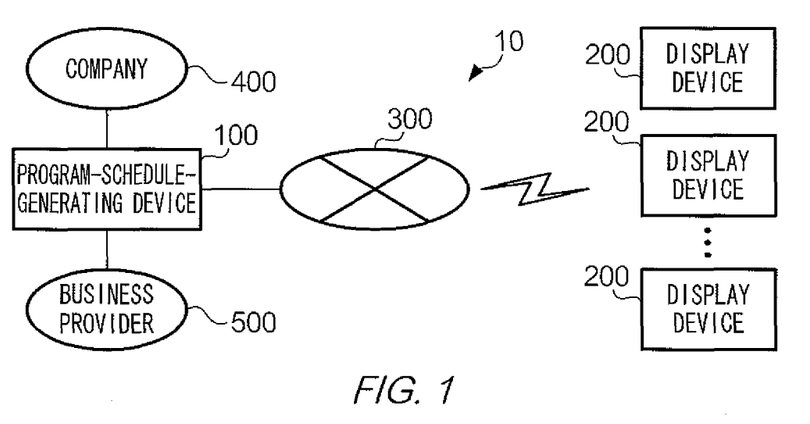
FIG. 1 is a block diagram showing an overall configuration of a program-data-sharing system.

FIG. 1 is a block diagram showing an overall configuration of program-data-sharing system 10 according to an embodiment of the present invention. Program-data-sharing system 10 includes program-schedule-generating device 100 and a plurality of display devices 200; program-schedule-generating device 100 and display devices 200 are connected via network 300 to communicate with each other. It is to be noted that a program here refers to a television program. Additionally, in the following description, a person using display device 200 and viewing a program will be simply referred to as a "user."

Program-data-sharing system 10 is a communication system for sharing program data between users, and for acquiring a program schedule that may be different for each user. In program-data-sharing system 10, a user can provide program-schedule-generating device 100 with program data of a program that the user wishes to view, and receive program schedule data generated by program-schedule-generating device 100 based on the program data. A user of display device 200 therefore corresponds to an example of an information provider that provides program data.

The information provider corresponds not only to the user of display device 200, but also to company 400 and business provider 500. Company 400 may include a sponsor of a program and a promotional company introducing a personality appearing in a program. Business provider 500 is a person that provides a user (namely a viewer) with program data on a commercial basis. Business provider 500 acquires detailed program data from a broadcasting station, and provides program-schedule-generating device 100 with the program data.

The user of display device 200 is a member of a predetermined service. The "predetermined service" referred to here is a service that facilitates creation of an association between a user and another user; for example, a Social Networking Service (SNS) may correspond to the service. It is assumed in the present embodiment that this service is a service known as a micro blog (mini blog) that facilitates posting of a message. This service creates an association between users by declaring one user's intention (or declaring both users' intentions). In the following description, another user associated to a user by the service refers to a "friend (of the user)," and an act for making a user a friend in this manner refers to a "registration." It is to be noted that a provider of this service does not have to be identical to a provider of program-data-sharing system 10. However, it is required that program-schedule-generating device 100 can acquire a message posted using the service.

Display device 200 is a communication terminal for receiving program schedule data from program-schedule-generating device 100 and for allowing a user, who is a viewer of a program, to check a program schedule. It is sufficient for display device 200 to be able to display a program schedule, and therefore, display device 200 does not have to display a program; however, display device 200 here can display both the program schedule and program. Display device 200 here is also a wireless communication terminal such as a mobile telephone (including a smart phone), a tablet terminal, and a Personal Digital Assistant (PDA). Display device 200 performs wireless communications via network 300.

It is to be noted that network 300 here is a network including at least a wireless communications network. The wireless communications network referred to here is, for example, a mobile communications network in conformity with a standard such as International Mobile Telecommunication-2000 (IMT-2000) or a Long Term Evolution (LTE); the wireless communication network may also be a wireless Local Area Network (LAN), etc. Network 300 may also be a multiple network including a mobile communications network and the Internet connected to each other.

Figure 2:
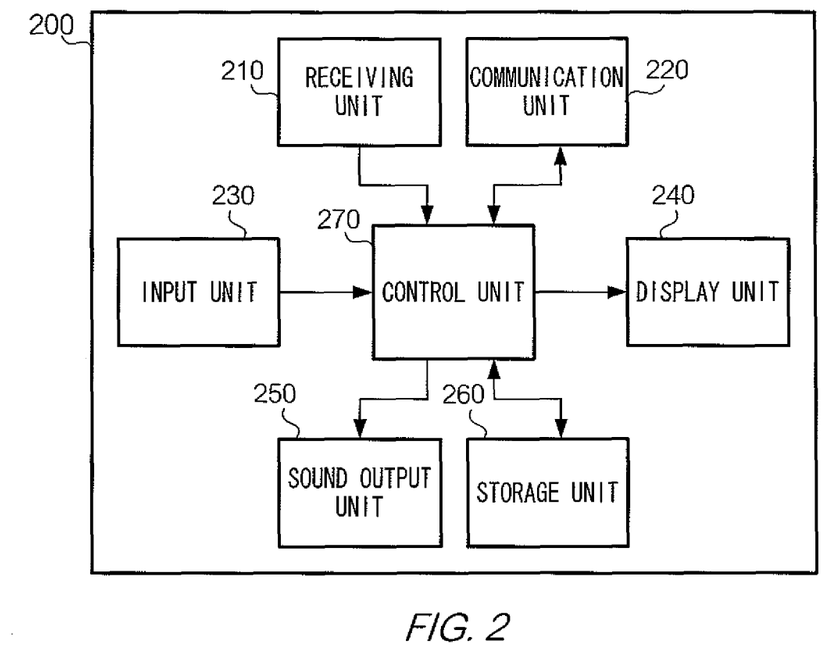
FIG. 2 is a block diagram showing a hardware configuration of a display device.

FIG. 2 is a block diagram showing a hardware configuration of display device 200. As shown in FIG. 2, display device 200 includes receiving unit 210, communication unit 220, input unit 230, display unit 240, sound output unit 250, storage unit 260, and control unit 270. It is to be noted that display device 200 may include, in addition to the configuration shown in FIG. 2, an illumination such as a light emitting diode or a vibrator that serves as a means for notifying a user of information.

Receiving unit 210 is a means for receiving a broadcast wave. On the other hand, communication unit 220 is a means for transmitting and receiving data via network 300. Each of receiving unit 210 and communication unit 220 includes an antenna for receiving a corresponding radio wave, and a decoder for decoding the received radio wave. Receiving unit 210 supplies control unit 270 with video data corresponding to a picture represented by the received radio wave.

The broadcast wave here refers to a radio wave used for a public transmission. Any frequency and any transmission method may be applied for the broadcast wave so long as display device 200 is capable of receiving the broadcast wave. For example, the broadcast wave may be transmitted via a satellite. However, it is assumed in the present embodiment that the broadcast wave is transmitted via terrestrial digital television broadcasting. The broadcast wave may be a broadcast wave for so-called 1 seg broadcasting (a service directed at a mobile telephone and mobile terminal for receiving parts of divided data segments).

Input unit 230 is a means used by a user for inputting a character or symbol similar thereto (hereinafter referred to as a "character etc."). Input unit 230 may be a keypad (keyboard) with a so-called QWERTY layout, or may be implemented by a touch screen provided on a display area of display unit 240. It is to be noted that the character etc. may include an emoticon and a pictogram.

Display unit 240 is a means for displaying an image such as a program schedule. Display unit 240 includes a display panel for displaying an image through the use of a liquid crystal element or an organic electroluminescence element, and a driver circuit for the display panel. Sound output unit 250 is a means for outputting a sound. Sound output unit 250 may include a speaker, a terminal for connecting an external speaker or earphones, or both.

Storage unit 260 is a means for storing data used by control unit 270. Storage unit 260 consists of, for example, a hard disk and flash memory. Storage unit 260 may store a program executed by control unit 270 and program schedule data. It is to be noted that storage unit 260 may include a removable storage medium such as a so-called memory card.

Control unit 270 is a means for controlling an operation of display device 200. Control unit 270 includes an arithmetic processing circuit such as a Central Processing Unit (CPU) and Graphics Processing Unit (GPU), and a memory, and implements receipt of data and display of a picture by performing processing according to programs. The programs executed by control unit 270 include an application program for transmitting program data and receiving program schedule data, and an application program for posting a message of a micro blog. It is to be noted that a web browser may be used as a substitute for the programs if program-schedule-generating device 100 serves as a web server and performs a main function of the programs.

Figure 3:
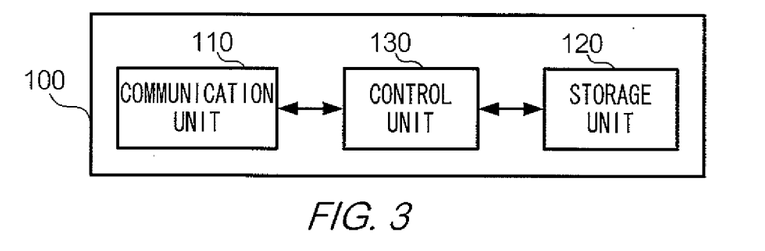
FIG. 3 is a block diagram showing a hardware configuration of a program-schedule-generating device.

FIG. 3 is a block diagram showing a hardware configuration of a program-schedule-generating device 100. Program-schedule-generating device 100 includes communication unit 110, storage unit 120, and control unit 130. Communication unit 110 is a means for transmitting and receiving data. Communication unit 110 receives program data from display device 200 and transmits program schedule data to display device 200 via network 300. Storage unit 120 is a means for storing data. Storage unit 120 has a storage area for storing program DB (database) 121 that stores program data, association DB 122 that stores an association between users, and conversion DB 123 that stores a conversion rule of a hashtag, described later. Control unit 130 is a means for controlling an operation of program-schedule-generating device 100, and acquires program data and generates program schedule data.

Program DB 121 stores program data associated with an information provider of the program data. To each information provider, for example, a unique ID is assigned. Association DB 122 stores an ID of a user associated with an ID of another information provider (a user or company 400). This means, for example, if an association between users is stored in association DB 122, those users are friends to each other. It is assumed that data representing such an association between users is provided in advance by a provider that provides a predetermined service. Conversion DB 123 associates and stores a hashtag, described later and (at least a part of) program data corresponding to the hashtag.

It is to be noted that if program-schedule-generating device 100 receives program data from company 400 or business provider 500, program-schedule-generating device 100 may receive the program data via communication unit 110 or may receive the program data through another means. For example, company 400 or business provider 500 may provide program data prerecorded on a recording medium such as a Digital Versatile Disc (DVD). In this case, program-schedule-generating device 100 is required to include a means for retrieving program data from the recording medium. Company 400 may post program data via a micro blog, as a user.

Figure 4A:
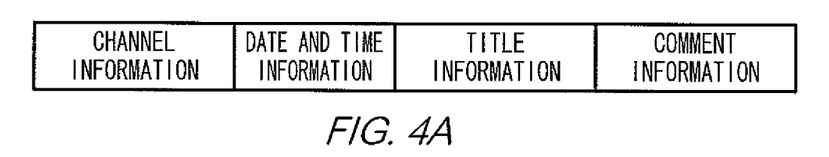
FIGS. 4a and 4b are diagrams exemplifying a data format of program data.

FIG. 4 is a diagram exemplifying a data format of program data according to the present embodiment. Program data is data including at least information for identifying a program. In the first format shown in FIG. 4A, program data consists of four items "channel information," "date and time information," "title information," and "comment information." Of this program data, the channel information and date and time information are required for identifying a program, and therefore they are essential input items. On the other hand, the title information and comment information are not required for identifying a program, and therefore they are arbitrary input items (the items do not have to be input) in an input operation by a user.

The channel information here refers to a number assigned to a broadcasting station to distinguish broadcasting stations from each other. The date and time information refers to a date and time at which a program is broadcast. Preferably, the date and time information is identical to a date and time at which a program is actually broadcast; however, some range of error (for example in minutes) may be allowed if a user inputs the date and time information. In addition, the date and time information preferably consists of both a start time and an end time of a program; however the date and time information may be incomplete, for example, consisting of only a start time if a user inputs the date and time information. By describing the channel information and date and time information in the program data, it is possible to identify a program corresponding to the program data, a date and time at which the program is scheduled to be broadcast, and a broadcasting station that broadcasts the program.

Title information is a title of a program. Comment information is supplementary information for explaining a program, and so on. If a user inputs comment information, the comment information is, for example, an expression used as a memorandum or an impression of a program, such as "Go home early (to view a program)" and "Can't miss it." On the other hand, if company 400 or business provider 500 inputs comment information, the comment information is information on a person appearing in a program or a message promoting a program, etc.

Figure 4B:
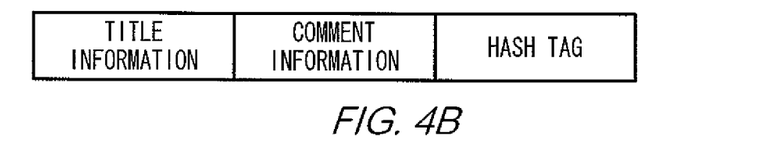

The program data may be described in a second format shown in FIG. 4B. The second format includes a "hashtag" in addition to the "title information" and "comment information," similar to the first format. In the second format, only a hashtag is an essential input item, and the title information and comment information are arbitrary input items. The hashtag is a character etc. assigned as a unique identifier of a program, and is an input item described according to a predetermined rule. It is assumed in the present embodiment that the hashtag is a title of a program, or an abbreviation or a popular name of the program with a symbol "#" added at the beginning. For example, if a title of a program is "XYZ," an example of the hashtag is "#XYX."

Figure 5:
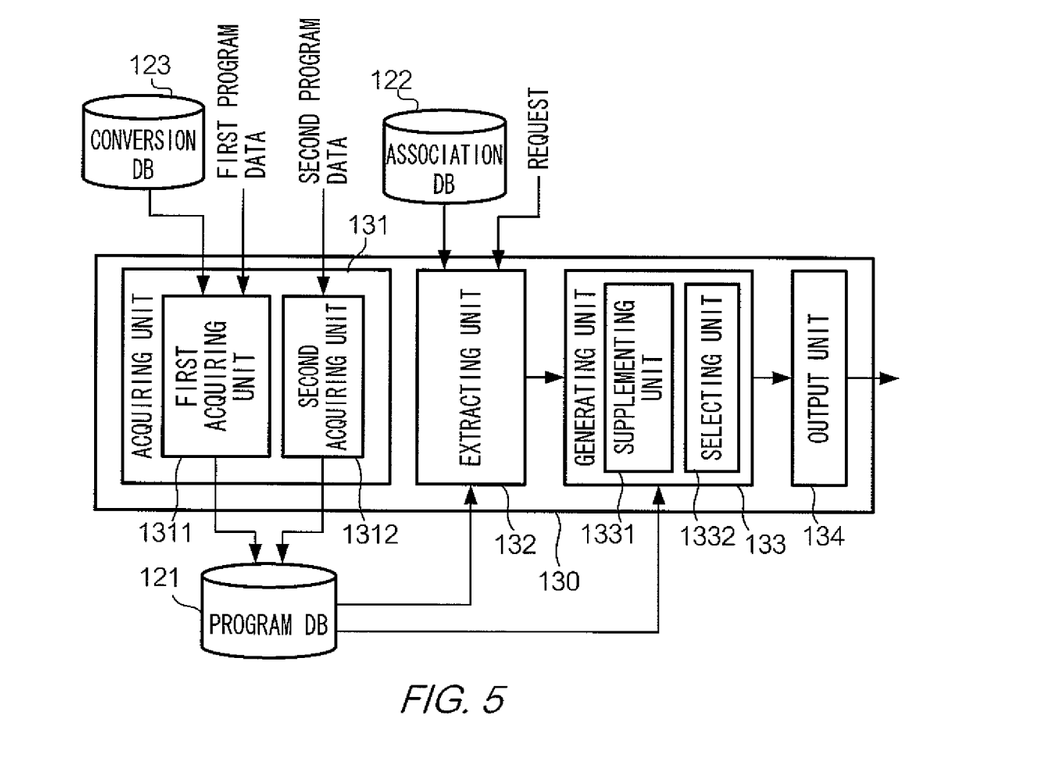
FIG. 5 is a diagram showing a functional configuration of the program-schedule-generating device.

FIG. 5 is a diagram showing a functional configuration of program-schedule-generating device 100. Control unit 130 of program-schedule-generating device 100 implements functions corresponding to acquiring unit 131, extracting unit 132, generating unit 133 and output unit 134 shown in FIG. 5, by executing one or more programs. In implementing the functions, control unit 130 refers to program DB 121, association DB 122, and conversion DB 123 stored in storage unit 120.

Acquiring unit 131 is a means for acquiring data. In more detail, acquiring unit 131 includes first acquiring unit 1311 and second acquiring unit 1312. First acquiring unit 1311 acquires program data provided by a user of display device 200 or company 400. On the other hand, second acquiring unit 1312 acquires program data provided by business provider 500. Both first acquiring unit 1311 and second acquiring unit 1312 record the acquired program data in program DB 121. It is to be noted that in the following description when program data acquired by first acquiring unit 1311 and program data acquired by second acquiring unit 1312 should be distinguished, the former is referred to as the "first program data" and the latter is referred to as the "second program data."

It is to be noted that the second program data corresponding only to a predetermined term (for example, a week to a month) is provided based on an agreement with business provider 500. In addition, a part of the second data corresponding to a program already broadcast is deleted from program DB 121 based on the agreement with business provider 500. However, this agreement is made artificially, and is not closely related to an invention itself. Therefore, the existence of such an agreement is not a requirement.

If first acquiring unit 1311 acquires the first program data in the second format (that is, acquires the program data as a message of a micro blog), first acquiring unit 1311 records the first program data in program DB 121 after converting a hashtag with reference to conversion DB 123. Conversion DB 123 stores at least channel information and date and time information as data corresponding to a hashtag. Conversion DB 123 may also store title information or comment information as the data corresponding to the hashtag. As a result, a data format of the program data recorded in program DB 121 is unified to the first format.

Extracting unit 132 is a means for extracting the first program data acquired by a user (subject user) and the first program data acquired by another information provider (a user or company 400) associated with the subject user, to generate program schedule data for the subject user. The subject user here means a user who is a subject of generation of program schedule data. Extracting unit 132 determines an association for the subject user using association DB 122. It is assumed in the present embodiment that extracting unit 132 starts to extract a user of the device as a subject user upon receipt of a request from display device 200 for generating the program schedule data.

Generating unit 133 is a means for generating program schedule data for a subject user based on the first program data extracted by extracting unit 132. The program schedule data is data used for displaying a program schedule in which programs are displayed being divided according to a date and time and channel. In more detail, generating unit 133 includes supplementing unit 1331 and selecting unit 1332. Supplementing unit 1331 and selecting unit 1332 do not necessarily operate continuously while program schedule data is generated, but operate as necessary.

Supplementing unit 1331 is a means for supplementing the first program data with the second program data when the first program data extracted by extracting unit 132 is insufficient. The insufficiency referred to here is a state in which date and time information are incorrect such that the date and time information represents a time deviation expressed in minutes or the date and time information fail to include an end time. Supplementing unit 1331 may also add title information or comment information to the first program data extracted by extracting unit 132. More specifically, supplementing unit 1331 identifies a program described in the first program data extracted by extracting unit 132, determines whether second acquiring unit 1312 acquires the second program data describing information on a program identical to the identified program and whether the second program data is stored in program DB 121; and if such second program data exists, supplementing unit 1331 performs supplement of data.

Selecting unit 1332 is a means for selecting a display mode of a program schedule. The display mode of the present embodiment includes a "partial display mode" in which only a program described in the first program data input by a subject user and another information provider (a user or company 400) associated with the subject user, is displayed, and an "entire display mode" in which all programs described in the second program data capable of being displayed, is displayed regardless of whether the first program data is extracted. It is assumed in the present embodiment that a mode selected as a display mode of a program schedule is designated by a subject user in advance. If selecting unit 1332 selects the entire display mode, generating unit 133 generates program schedule data using the first program data extracted by extracting unit 132 and the second program data stored in program DB 121 together.

Output unit 134 is a means for outputting program schedule data generated by generating unit 133. Output unit 134 transmits program schedule data for a subject user to display device 200 of the user via communication unit 110. Alternatively, output unit 134 may temporarily store the program schedule data in storage unit 120 if the program schedule data is not required to be output immediately.

A configuration of program-data-sharing system 10 is as described above. In this configuration, a user of display device 200 can transmit program data to program-schedule-generating device 100. The user may transmit the program data in the first format according to a predetermined application program, or may transmit the program data as a message of a micro blog. By using a micro blog, the user can post a message of anticipation of a program that is scheduled to be broadcast in the future, or a memorandum regarding the program, and also can post a message of an impression of a program that has already been broadcast; furthermore, the user can check a message posted by the user or another person, and share information. Program-schedule-generating device 100 records program data provided by a user and accumulates the program data in storage unit 120 in response to such an action of a user. Program-schedule-generating device 100 records, in addition to the program data provided by a user, program data provided by company 400 or business provider 500 together.

Figure 6:
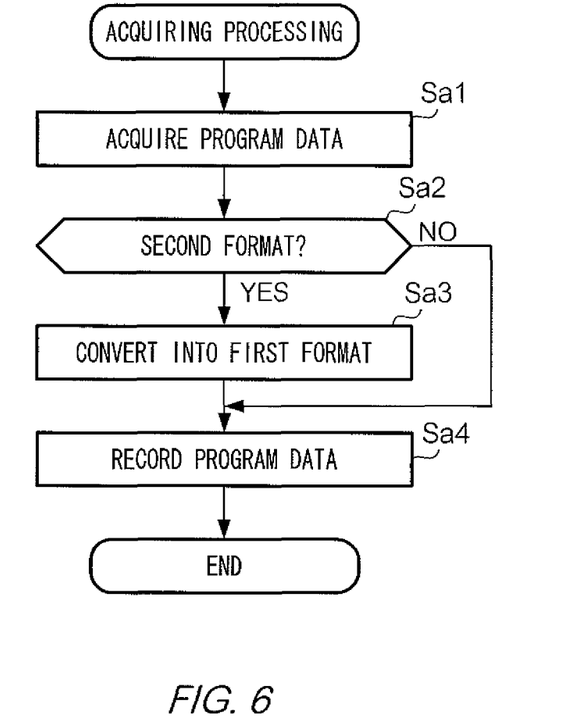
FIG. 6 is a flow chart showing acquiring processing.

FIG. 6 is a flow chart showing an acquiring processing that is one of processes performed by program-schedule-generating device 100. FIG. 6 particularly shows an acquiring processing in which program data is acquired in the second format. It is to be noted that if the program data (including the second program data) is acquired in the first format in the acquiring processing, processes of steps Sa2 and Sa3 are skipped (omitted) from the acquiring processing shown in FIG. 6.

In the acquiring processing, control unit 130 of program-schedule-generating device 100 acquires program data via communication unit 110 (step Sa1). Control unit 130 determines whether the acquired program data is in the second format (step Sa2); if the program data is in the second format, control unit 130 converts the program data into the first format by converting a hashtag into channel information and date and time information with reference to conversion DB 123 (step Sa3). If the program data is not in the second format, control unit 130 skips the processing of step Sa3. After either processing is terminated, control unit 130 records the program data in the first format in storage unit 120 (step Sa4).

It is to be noted that if a user transmits the program data in the second format, control unit 130 may divide a single item of program data into plural items of program data. For example, if a program having a single title, such as a drama series, is divided into several parts to be broadcast separately, control unit 130 can record plural parts of program data for the program.

While program-schedule-generating device 100 repeats this acquiring processing, display device 200 transmits to program-schedule-generating device 100 a request for receiving program schedule data at an appropriate timing. Display device 200 may transmit the request at a timing designated by a user operation, or may transmit the request at a timing irrespective of a user operation (for example, when display device 200 is turned on, or when a predetermined application program is launched). Upon receipt of the request from display device 200, program-schedule-generating device 100 generates program schedule data, and transmits the program schedule data to display device 200.

Figure 7:
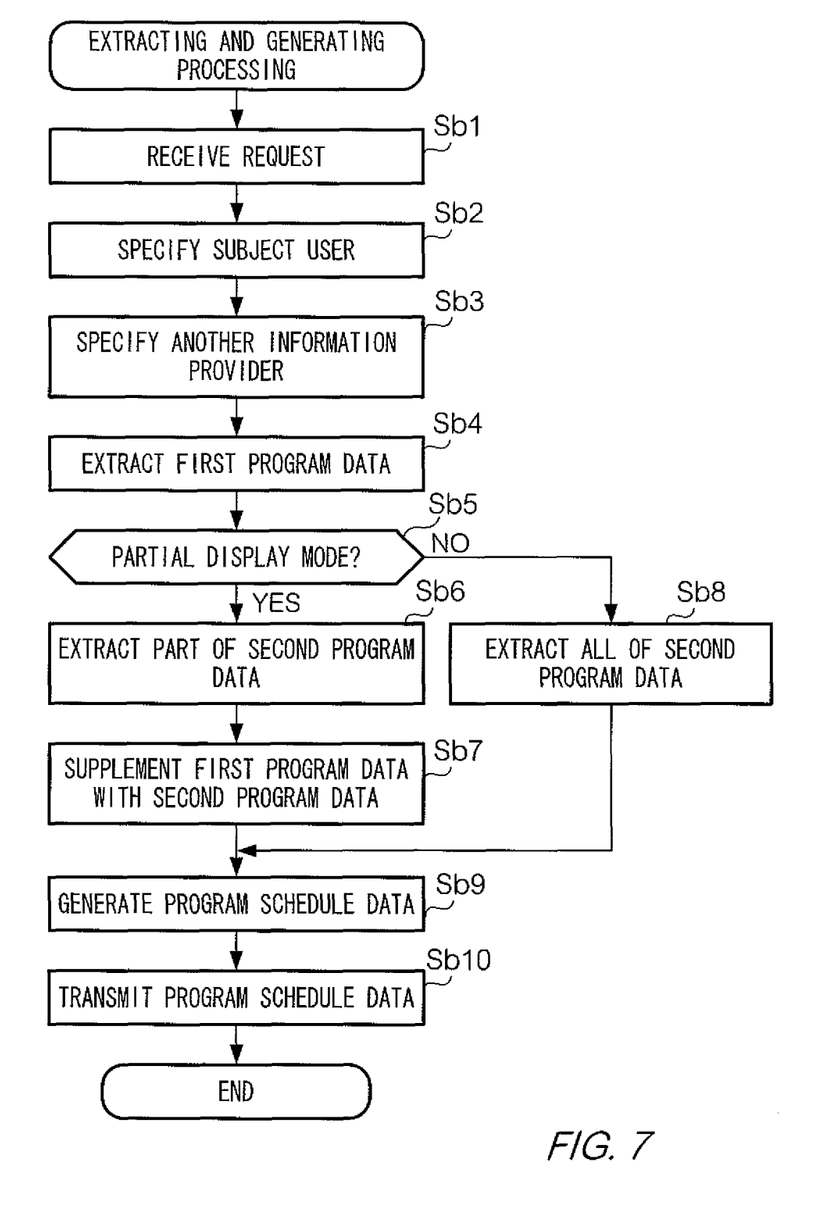
FIG. 7 is a flowchart showing extracting and generating processing.

FIG. 7 is a flowchart showing an extracting and generating processing that is one of processes performed by program-schedule-generating device 100. The extracting and generating processing is performed at a timing independent of the acquiring processing described above. Therefore, the extracting and generating processing may be performed in parallel with the acquiring processing. However, performance of the extracting and generating processing for a subject user requires that at least one item of program data be acquired for a program that is to be displayed in a program schedule for the user.

Control unit 130 starts the extracting and generating processing upon receipt of the request from display device 200 in step Sb1. Upon receipt of the request, control unit 130 specifies a user of display device 200 (namely a subject user) that transmits the request (step Sb2). The subject user can be specified using an appropriate well-known method. For example, the subject user may be specified by a method in which display device 200 transmits a request including a user ID, or a method in which control unit 130 requests display device 200 to perform user authentication before display device 200 transmits the request.

Upon specifying the subject user in this manner, control unit 130 specifies another information provider associated with the user (step Sb3). Control unit 130 can specify another information provider (such as a friend) associated with the user by reference to association DB 122. It is to be noted that if no information provider is found in association DB 122, control unit 130 is not required to specify another information provider.

Next, control unit 130 extracts program data provided by the information provider (namely, a subject user or another information provider) specified in step Sb2 or Sb3 (step Sb4). It is to be noted that the program data extracted in step Sb4 is the first program data.

Upon extracting the first program data, control unit 130 determines an operation mode that has been selected for the subject user (step Sb5). Namely, control unit 130 here determines whether an operation mode is a partial display mode or an entire display mode. A subsequent operation performed by control unit 130 is determined according to the selected operation (namely a result of selection by selecting unit 1332).

If the partial display mode has been selected as the operation mode, control unit 130 retrieves and acquires from program DB 121 only the second program data describing a program identical to a program described in the first program data extracted in step Sb4 (step Sb6). Subsequently, control unit 130 compares the first program data extracted in step Sb4 and the second program data acquired in step Sb6, and supplements information described in the first program data as necessary (step Sb7).

On the other hand, if the entire display mode has been selected as the operation mode, control unit 130 retrieves and acquires from program DB 121 all of the second program data capable of being acquired (step Sb8). The second program data capable of being acquired is determined here based on an agreement with business provider 500 described above. Therefore, the second program data of a program already broadcast at a time when control unit 130 operates does not correspond to the second program data capable of being acquired.

It is to be noted that control unit 130 may also perform a supplementary processing similar to step Sb7 after processing of step S8.

Upon acquiring the second program data in this manner, control unit 130 generates program schedule data (step Sb9). In step Sa9, control unit 130 generates program schedule data using the first program data, which is extracted in step Sb4 and is supplemented in step Sb7 if the partial display mode has been selected; on the other hand, control unit 130 generates program schedule data using both the first program data extracted in step Sb4 and the second program data acquired in step Sb8 if the entire display mode has been selected. Upon generating the program schedule data, control unit 130 outputs the program schedule data, and transmits the program schedule data to display device 200 of the subject user via communication unit 110 (step Sb10).

Figure 8A:
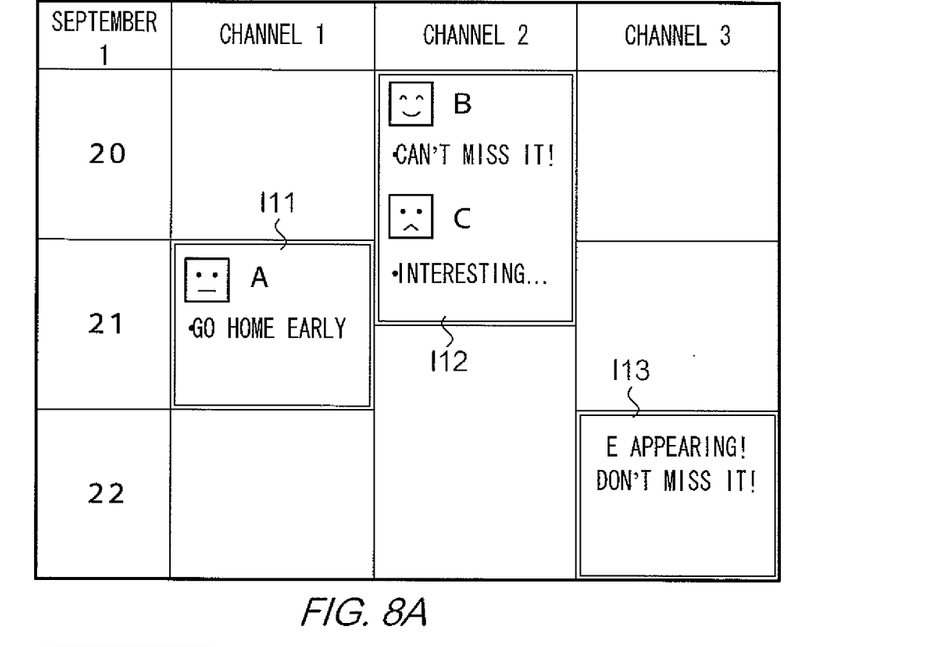
FIGS. 8a and 8b are diagrams showing an example of display of a program schedule.
Figure 8B:
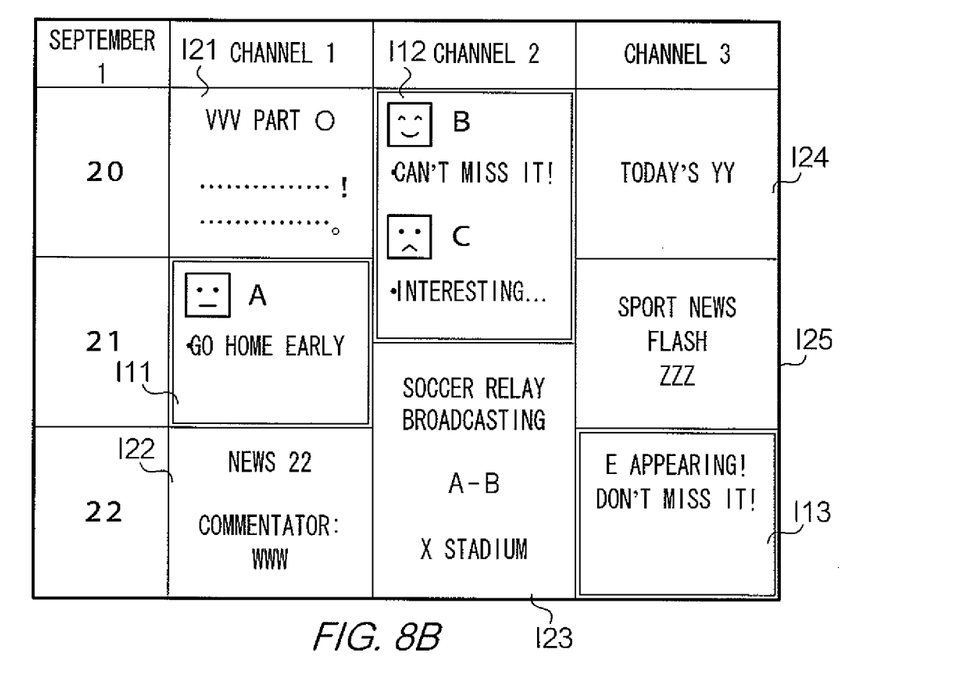

FIG. 8 is a diagram showing an example of display of a program schedule based on program schedule data generated by program-schedule-generating device 100. This example of display shows a part of a program schedule on September 1. This program schedule is displayed on a date prior to September 1. In addition, in this example of display, FIG. 8A shows a program schedule displayed if an operation mode is the partial display mode, and FIG. 8B shows a program schedule displayed if an operation mode is the entire display mode.

It is to be noted that, although detailed description is omitted here, program schedule data of the present embodiment is not limited to one that is used for displaying information on one day's programs, but may be one that is used for displaying information on several days' programs.

Here program information I11, I12, and I13 is program information displayed based on the first program data, program information I21, I22, I23, I24, and I25 is program information displayed based on the second program data, irrespective of the first program information. In other words, program information I21, I22, I23, I24, and I25 relates to programs program data of which is provided neither by a subject user nor by another information provider associated with the user. Positions of an upper end and a lower end of the program information are determined based on date and time information. For example, program information I11 is displayed based on program data representing a program that starts at 21:00 and ends at 22:00.

In FIG. 8A, program information I11 and I12 corresponds to program data provided by users of display devices 200. In this example, program information I11 is displayed in a case where user A has input comment information "go home early" for a program scheduled to be broadcast on Channel 1 from 21:00 to 22:00. Program information I12 is displayed in a case where each of users B and C has input comment information for a program scheduled to be broadcast on Channel 2 from 20:00 to 21:30. It is to be noted that the program information may include an image (icon) used for ease of visual identification of users.

In FIG. 8A, program information I13 corresponds to program data provided by company 400. In this example, program information I13 indicates that a certain personality is appearing on a program scheduled to be broadcast on Channel 3 at 22:00.

In the program schedule shown in FIG. 8A, program slots in some columns are blank. On the other hand, in the program schedule shown in FIG. 8B, such a blank is filled with program information I21, I22, I23, I24, and I25; in this regard, the program schedule shown in FIG. 8B is different from the program schedule shown in FIG. 8A. In addition, an appearance of program information I21, I22, and I23 may be different from that of program information I11, I12, I13, I24, and I25. For example, program information I21, I22, I23, I24, and I25 may be displayed in black and white, and program information I11, I12, and I13 may be displayed in color. Furthermore, program information I11, I12, and I13 may be displayed in a color that varies according to an information provider, or may be have a brightness or color saturation that varies according to a number of an information provider (namely a number of the first program data item extracted by extracting unit 132) that provides program data for the identical program.

Figure 9:
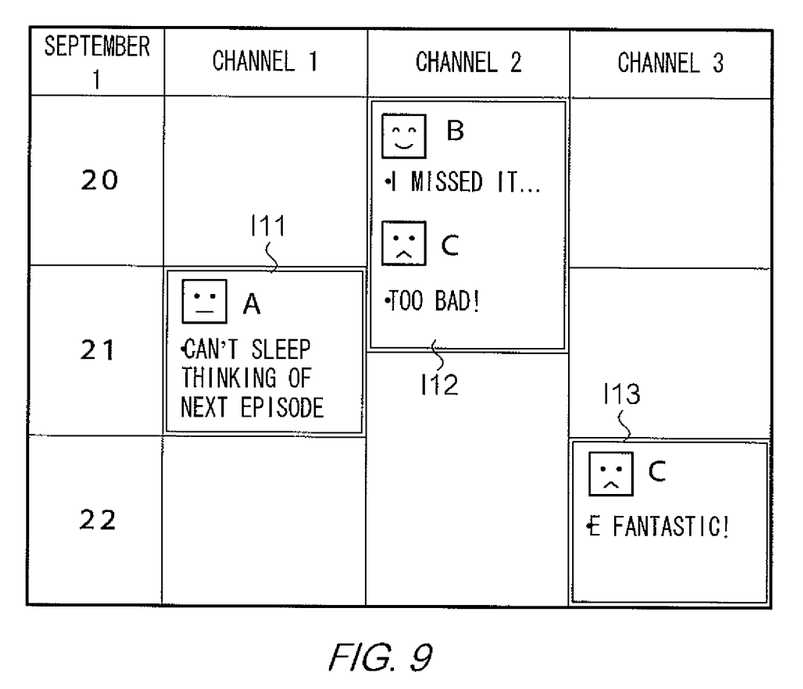
FIG. 9 is a diagram showing an example of display of a program schedule.

FIG. 9 is a diagram showing another example of display of a program schedule based on program schedule data generated by program-schedule-generating device 100. This example of display is similar to the example of display shown in FIG. 8 in that it shows a part of a program schedule on September 1; however the example of display shown in FIG. 9 is different from the example of display shown in FIG. 8 in that a program schedule is displayed after September 1. In this example, program information I21, I22, I23, I24, and I25 is hidden irrespective of whether an operation mode is the partial display mode or entire display mode. This is determined based on an agreement with business provider 500.

In addition, comment information displayed in program information I11, I12, and I13 is different from that of the program schedule shown in FIG. 8. The comment information displayed in the example of FIG. 9 is provided following the comment information displayed in the example of FIG. 8, and is, for example, information on an impression after viewing of the program, and so on.

Figure 10:
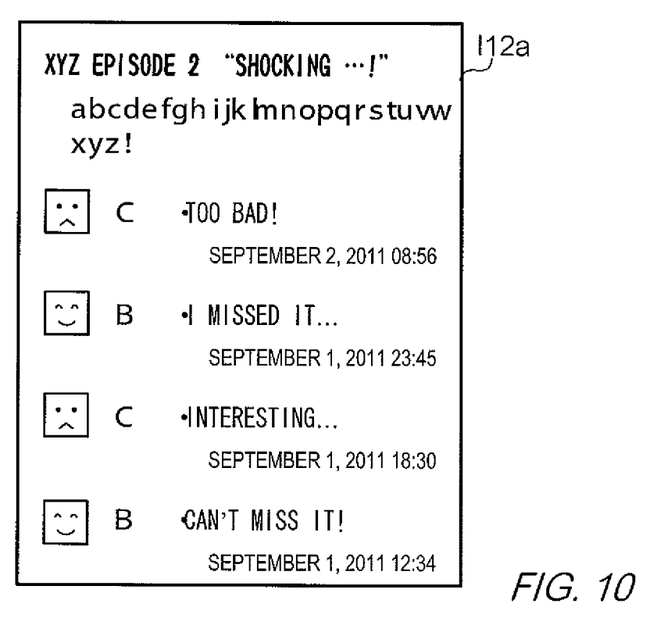
FIG. 10 is a diagram showing an example of display of a program schedule.

FIG. 10 is a diagram showing an example of a content displayed when a user performs an operation to expand an amount of program information I12. Display device 200 can vary a display appearance of a program schedule according to a user operation in this manner. In expanded program information I12a, an amount of information displayed is greater than an amount of program information I12. In other words, program information I12 representatively displays a part of information capable of being displayed as program information. In this example, all provided comment information is displayed in chronological order in program information I12a. Program information I12a includes title information in addition to the comment information.

As described above, according to program-data-sharing system 10 of the present embodiment, it is possible to share program data between users having a predetermined association (social connection) as a friend. According to the present embodiment, a user can use a program schedule as not only a schedule but also as a tool for facilitating communication with a friend via a television. In particular, a program schedule of the present embodiment facilitates reference to both comment information for a past program and comment information for a future program, and therefore, it is possible to discuss a program already broadcast and also discuss a program to be broadcast hereafter.

In addition, in the program schedule of the present embodiment, it is possible to hide unwanted program information by selecting the partial display mode. Generally, users do not view all programs on all channels. That is, it may be sufficient for a general user to acquire only information on a program that the user wishes to view. According to program-schedule-generating device 100 of the present embodiment, it is possible to acquire a program schedule according to each of the partial display mode or entire display mode, and therefore it is possible to acquire selectively either of a program schedule appropriate for viewing comment information of the user or a friend, and a program schedule appropriate for general viewing information on programs in response to a requirement of the user at the time.

In addition, according to program-data-sharing system 10 of the present embodiment, it is possible to display program information on programs to be broadcast in the distant future such as has not yet been prepared by business provider 500. Furthermore, according to program-data-sharing system 10, when a broadcast date and time of a program is approaching, and business provider 500 becomes ready to provide program data, it is possible to supplement program data input by a user with the program data provided by business provider 500. This embodiment is particularly effective for sharing with a friend information on an upcoming large-scale regular event (Olympics, Soccer World Cup, etc.) that is likely to be broadcast, but for which a concrete schedule is not fixed until shortly before the event takes place. According to the present embodiment, a user can discuss the event and share information on the event with a friend by merely defining an appropriate hashtag or inputting a rough schedule of the event.

It is to be noted that in display device 200 a function for playing a telecast may work with a program schedule. For example, when a start time of a broadcast of a program corresponding to program data for which a user (or friend) inputs comment information, is approaching, display device 200 may notify a user accordingly through the use of an illumination and/or a vibrator, or may start to play the program.

Second Embodiment

Program-data-sharing system 10 according to the present embodiment includes a hardware configuration in common with that of the first embodiment described above; however, some functions implemented in program-schedule-generating device 100 differ from those of the first embodiment. Accordingly, in the following description, the points that differ from those of the first embodiment are mainly described, and features in common with those of the first embodiment are omitted from the description appropriately. In the present embodiment, elements described with references identical to those of the first embodiment have configurations in common with those of the first embodiment.

Figure 11:
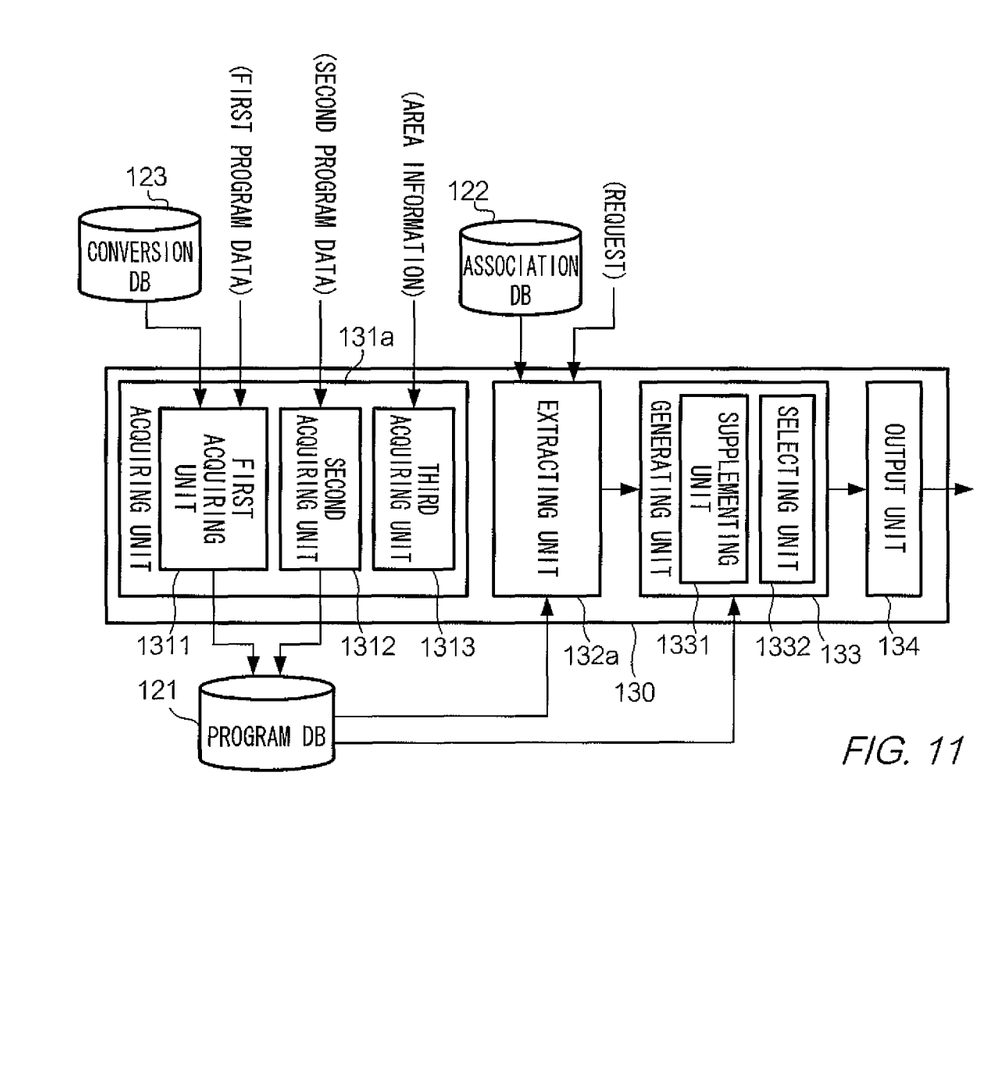
FIG. 11 is a diagram showing a functional configuration of the program-schedule-generating device.

FIG. 11 is a diagram showing a functional configuration of the program-schedule-generating device 100. Control unit 130 of program-schedule-generating device 100 differs from that of the first embodiment (refer to FIG. 5) in that it includes acquiring unit 131a instead of acquiring unit 131, and extracting unit 132a instead of extracting unit 132.

Acquiring unit 131a includes third acquiring unit 1313, in addition to first acquiring unit 1311 and second acquiring unit 1312, which are similar to those described in the first embodiment. The third acquiring unit 1313 is a means for acquiring area information representing an area corresponding to an information provider. The area information referred to here represents an area in which a user of display device 200 views a program, or an area in which company 400 wishes to provide program data. The area information may represent an administrative division such as a prefecture and region, or may represent an area capable of receiving a broadcast wave from a certain broadcasting station. It is to be noted that the area information may be assigned not only to a user of display device 200 but also to company 400 or business provider 500.

Acquiring unit 131a may acquire area information from an information provider directly, or may acquire information from a different source. For example, in a case where acquiring unit 131a acquires area information directly from display device 200, display device 200 stores the area information in advance. Alternatively, display device 200 may have a positioning function for acquiring location information (information representing a latitude and longitude) of the device by a Global Positioning System (GPS), and may provide the acquired location information as area information. If an external device stores information corresponding to area information of display device 200, program-schedule-generating device 100 may acquire the area information from the external device.

When extracting unit 132a specifies another information provider (refer to step Sb3), extracting unit 132a uses, in addition to an association stored in association DB 122, area information acquired by the third acquiring unit 1313 for determining an association between a subject user and another information provider. That is, another information provider specified by extracting unit 132a has an association with a subject user based on an association stored in association DB 122, and is also an information provider for which area information representing an area in common with that of the subject user is acquired.

According to the present embodiment, it is possible to apply a local connection to an association between users so that users located geographically close to each other can share program data. According to the present embodiment, it is also possible to share program data in consideration of a broadcasting station or a difference in a program between areas.

It is to be noted that extracting unit 132a may specify another information provider only using area information without an association stored in association DB 122, instead of specifying another information provider using both the area information and association stored in association DB 122.

Modification

The present invention is not limited to the embodiment described above, but may be implemented in another embodiment. For example, the present invention may be implemented in a modified embodiment described below. It is to be noted that the present invention may be implemented in an embodiment combining plural modifications.

The present invention may be implemented in an embodiment without using the second program data (namely program data provided by business provider 500). In this case, it is not necessary to have a configuration corresponding to supplementing unit 1331 included in generating unit 133, or for switching of an operation mode to be enabled. In a case where an operation mode is not switched, generating unit 133 also does not have to include selecting unit 1332.

(2) In the example shown in FIG. 8, display of program information I21 to I25 is implemented by a designation of an operation mode in advance by a user. However, program-schedule-generating device 100 may generate and transmit program schedule data capable of displaying program schedule in both display modes shown in FIG. 8A and FIG. 8B. This program schedule data allows a user to switch a display mode of a program schedule by performing a predetermined operation.

(3) If program-schedule-generating device 100 transmits program schedule data to an identical user plural times, program-schedule-generating device 100 may generate only partial program schedule data corresponding to a difference from program schedule data transmitted previously (namely program schedule data consisting of a part of program schedule data for the user), instead of newly re-generating entire program schedule data each time, and may transmit the generated partial program schedule data to display device 200.

(4) In the foregoing embodiment, users having an association described in association DB 122 are referred to as a "friend;" however, a relationship to a user does not have to be that of friend, but may be that of coworker, close family member, or relative.

(5) A program of the present invention is not limited to a television program, but may be a radio program. The program is not limited to be received by wireless communication, but may be received by wired communication. It is sufficient for display device 200 to display a program schedule; therefore, it is not essential that display device 200 has a function to play a program with a sound or image.

(6) A broadcast of the present invention is not limited to a broadcast using a broadcast wave (namely a radio wave) that is received wirelessly. The broadcast of the present invention may transmit a program via a network such as the Internet. The broadcast of the present invention may be a multimedia broadcast for a mobile terminal in conformity with a standard such as Integrated Services Digital Broadcasting Terrestrial for mobile multimedia (ISDB-Tmm) and Digital Multimedia Broadcasting (DMB).

(7) In the foregoing embodiment, extracting unit 132 starts the extraction in response to a request from display device 200. However, extracting unit 132 may start the extraction regardless of the request from display device 200. For example, extracting unit 132 may perform the extraction during a time when acquisition of program data etc. is not performed.

(8) The present invention may be understood as not only program-schedule-generating device 100 or program-data-sharing system 10 including program-schedule-generating device 100, but also a program executed by program-schedule-generating device 100 or a method of generating program schedule data. This program may be provided prerecorded on a recording medium such as an optical disk, or by being downloaded onto a computer via a network such as the Internet and installed to so as to be available to a user.

What is claimed is:

1. A program-schedule-generating device comprising:
a processor to:
acquire a plurality of first program data items provided by a plurality of users, the plurality of first program data items describing information of a program already broadcast by a broadcasting station on a particular date and time or scheduled to be broadcast by a broadcasting station on a particular date and time, the plurality of first program data items including at least information used for identifying the program;
acquire a second program data item provided by a data-providing company in a predetermined format in which time slots are provided for each broadcast station;
extract from the acquired plurality of first program data items, a first program data item provided by a first user, and a first program data item provided by a second user associated with the first user; and
generate, before the program is broadcast, a first program schedule by converting the extracted first program data item provided by the first user and the first program data item provided by the second user to conform to the format and writing the converted first program data items in a blank program slot of the first program schedule,
wherein, after the program is broadcast, a second program schedule based on the extracted first program data items that are provided by the first user and the second user after the program is broadcast, the second program schedule forming a second program schedule for the first user, the second program schedule for the first user generated after the program is broadcast includes the first program data items provided after the program is broadcast in a blank program slot of the second program schedule for the first user, and does not include the first program data items provided before the program is broadcast.

2. The program-schedule-generating device according to claim 1, wherein the plurality of users include at least a viewer of the program; and
wherein the first program schedule is generated using the extracted first program data item and the acquired second program data item.

3. The program-schedule-generating device according to claim 2, wherein the processor further supplements information on a program to be displayed in the first program schedule with the second program data item when the acquired second program data item describing information on the same program as that included in the extracted first program data item.

4. The program-schedule-generating device according to claim 2, wherein the processor is further:
selects whether to permit display of information on a program, the information being included in a plurality of information items on a program displayed in the first program schedule and also being displayed irrespective of the first program data items; and
the first program schedule is generated based on a result of a selection.

5. The program-schedule-generating device according to claim 1, wherein the processor further:
extracts a plurality of first program data items describing information on a single program; and
generates the first program schedule such that information on the program is displayed in the first program schedule in a color that varies according to a number of the extracted first program data items.

6. The program-schedule-generating device according to claim 1, wherein the processor to further:
acquires area information representing an area corresponding to the first user, and wherein the acquired area information is used for determining an association between the first user and the second user.

7. A program-data-sharing system comprising:
a processor to:
acquire a plurality of first program data items provided by a plurality of users, the plurality of first program data items describing information on a program already broadcast by a broadcasting station on a particular date and time or scheduled to be broadcast by a broadcasting station on a particular date and time, the plurality of first program data items including at least information used for identifying the program;
acquire a second program data item provided by a data-providing company in a predetermined format in which time slots are provided for each broadcast station;
extract from the acquired plurality of first program data items, a first program data item provided by a first user, and a first program data item provided by a second user associated with the first user;
generate, before the program is broadcast, a first program schedule by converting the extracted first program data item provided by the first user and the first program data item provided by the second user to conform to the format and writing the converted first program data items in a blank program slot of the first program schedule; and
generates, after the program is broadcast, a second program schedule based on the extracted first program data items that are provided by the first user and the second user after the program is broadcast, the second program schedule forming a second program schedule for the first user, the second program schedule data for the first user generated after the program is broadcast includes the first program data items provided after the program is broadcast in a blank program slot of the second program schedule for the first user, and does not include the first program data items provided before the program is broadcast; and
a plurality of display devices used by the plurality of users for displaying the program schedule data.

8. A method of generating a program schedule comprising:
a first step of acquiring a plurality of first program data items provided by a plurality of users, the plurality of first program data items describing information of a program already broadcast by a broadcasting station on a particular date and time or scheduled to be broadcast by a broadcasting station on a particular date and time, the plurality of first program data items including at least information used for identifying the program;
a second step of acquiring a second program data item provided by a data-providing company in a predetermined format in which time slots are provided for each broadcast station;
a third step of extracting from the plurality of first program data items acquired in the first step, a first program data item provided by a first user, and a first program data item provided by a second user associated with the first user;
a fourth step of generating, before the program is broadcast, a first program schedule by converting the first program data item provided by the first user and the first program data item provided by the second user extracted to conform to the format and writing the converted first program data item in a blank program slot of the first program schedule; and a fifth step of generating, after the program is broadcast, a second program schedule based on the extracted first program data items that are provided by the first user and the second user after the program is broadcast, the second program schedule forming a second program schedule for the first user, the second program schedule for the first user generated after the program is broadcast includes the first program data items provided after the program is broadcast in a blank program slot of the second program schedule for the first user, and does not include the first program data items provided before the program is broadcast.

9. A non-transitory computer-readable medium storing a program for causing a computer to execute:

a first step of acquiring a plurality of first program data items provided by a plurality of users, the plurality of first program data items describing information of a program already broadcast by a broadcasting station on a particular date and time or scheduled to be broadcast by a broadcasting station on a particular date and time, the plurality of first program data items including at least information used for identifying the program;

a second step of acquiring second program data items provided by a data-providing company in a predetermined format in which time slots are provided for each broadcast station;

a third step of extracting from the plurality of first program data items acquired in the first step, a first program data item provided by a first user, and a first program data item provided by a second user associated with the first user;

a fourth step of generating, before the program is broadcast, a first program schedule by converting the extracted first program data item provided by the first user and the first program data item provided by the second user to conform to the format and writing the converted first program data item in a blank program slot of the first program schedule; and a fifth step of generating, after the program is broadcast, a second program schedule based on the first program data items that are provided by the first user and the second user after the program is broadcast, the second program schedule forming a second program schedule for the first user, the second program schedule for the first user generated after the program is broadcast includes the first program data items provided after the program is broadcast in a blank program slot of the second program schedule for the first user, and does not include the first program data items provided before the program is broadcast.

* * * * *